United States Patent
Tatehata et al.

(10) Patent No.: US 8,025,435 B2
(45) Date of Patent: Sep. 27, 2011

(54) LIGHT GUIDE SHEET AND MOVABLE CONTACT ELEMENT USING THE SAME

(75) Inventors: Naoki Tatehata, Kyoto (JP); Yousuke Chikahisa, Hyogo (JP); Tsutomu Aisaka, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 12/392,249

(22) Filed: Feb. 25, 2009

(65) Prior Publication Data

US 2009/0268454 A1    Oct. 29, 2009

(30) Foreign Application Priority Data

Feb. 28, 2008   (JP) ................................. 2008-047046

(51) Int. Cl.
*F21V 7/10* (2006.01)
*F21V 7/04* (2006.01)
*H01H 9/16* (2006.01)

(52) U.S. Cl. .......... 362/616; 362/613; 362/607; 362/27; 200/310

(58) Field of Classification Search .................. 362/235, 362/606–608, 26–27, 551, 555, 612–613, 362/616; 200/310
See application file for complete search history.

(56) References Cited

U.S. PATENT DOCUMENTS

| | | | | |
|---|---|---|---|---|
| 3,668,356 A | * | 6/1972 | Kekas | 200/338 |
| 5,491,313 A | * | 2/1996 | Bartley et al. | 200/310 |
| 5,975,711 A | * | 11/1999 | Parker et al. | 362/24 |
| 5,986,228 A | * | 11/1999 | Okamoto et al. | 200/516 |
| 6,329,617 B1 | * | 12/2001 | Burgess | 200/61.43 |
| 6,860,612 B2 | * | 3/2005 | Chiang et al. | 362/29 |
| 6,906,274 B2 | * | 6/2005 | Ito et al. | 200/512 |
| 7,525,454 B2 | | 4/2009 | Jung et al. | |
| 2005/0103610 A1 | * | 5/2005 | Hirahata et al. | 200/310 |
| 2006/0062624 A1 | * | 3/2006 | Choi | 400/481 |
| 2007/0039809 A1 | * | 2/2007 | Aihara et al. | 200/310 |

FOREIGN PATENT DOCUMENTS

| | | |
|---|---|---|
| CN | 1866435 | 11/2006 |
| CN | 1917113 | 2/2007 |
| JP | 2007-87749 | 4/2007 |

* cited by examiner

*Primary Examiner* — Ismael Negron
(74) *Attorney, Agent, or Firm* — Wenderoth, Lind & Ponack, L.L.P.

(57) ABSTRACT

A light guide sheet and a movable contact element using the single sheet have a simple structure and can be variously illuminated. The light guide sheet includes irregular-shaped light extracting elements formed on a film-like base material; and light-transmissive, belt-shaped light guide parts each connecting a predetermined number of groups of the light extracting elements. In addition, dome-shaped movable contacts formed of a conductive sheet metal are arranged on the bottom surfaces of the light extracting elements.

11 Claims, 3 Drawing Sheets

LIGHT GUIDE SHEET AND MOVABLE CONTACT ELEMENT USING THE SAME

BACKGROUND OF THE INVENTION

1. Field of the Invention

The present invention relates to a light guide sheet and a movable contact element using the sheet, which are used to operate various electronic apparatuses.

2. Background Art

In recent years, an increasing number of electronic apparatuses such as portable telephones and other portable terminals have come to use light emitting diodes or EL (electroluminescent) devices as light sources to illuminate their operating parts. The illumination allows the user to easily distinguish between push buttons or to operate the display in dark environments. In line with this trend, movable contact elements and switches used in these apparatuses are also expected to be more user-friendly and capable of being variously illuminated.

FIGS. 6 and 7 are a sectional view and a plan view, respectively, of a conventional switch. In FIGS. 6 and 7, the dimensions of some parts are exaggerated for clarity.

The switch includes movable contact element 6 having light guide sheet 3, which is formed of light-transmissive, film-like base material 1 and irregular-shaped light extracting elements 2 arranged in predetermined positions on the top surface of base material 1. The switch also includes film-like cover sheet 4 whose outer periphery is pasted at predetermined positions on the bottom surface of light guide sheet 3 via an adhesive (not shown). The switch also includes dome-shaped movable contacts 5, which are formed of a conductive sheet metal and pasted on the bottom surface of cover sheet 4 under light extracting elements 2.

The switch also includes wiring board 7, which is provided on its upper and lower surfaces with wiring patterns (not shown). Wiring board 7 is also provided on its upper surface with fixed contacts 8 each consisting of circular central fixed contact 8A and horseshoe- or ring-shaped outer fixed contact 8B surrounding central fixed contact 8A. Movable contact element 6 is pasted on the top surface of wiring board 7. More specifically, the outer peripheries of movable contacts 5 are placed on outer fixed contacts 8B, and the centers of the bottom surfaces of movable contacts 5 are predeterminedly spaced from central fixed contacts 8A.

The switch also includes light-emitting devices 9 composed of light emitting diodes or the like arranged on sides of light guide sheet 3 on the top surface of wiring board 7. Light-emitting devices 9 are arranged with their light emitting surfaces facing one side of base material 1.

The switch also includes light-transmissive, film-like display sheet 10, which is provided on its bottom surface with light shielding part 10A formed by printing or the like, and display parts 10B hollowed out in the shape of characters, symbols, and the like. Display parts 10B are arranged over light extracting elements 2 of light guide sheet 3.

The switch thus structured is installed on the control surface of an electronic apparatus, with central fixed contacts 8A, outer fixed contacts 8B, and light-emitting devices 9 connected to electronic circuits (not shown) of the apparatus via the wiring patterns.

When the user presses one of display parts 10B of display sheet 10, light guide sheet 3 and cover sheet 4 are bent to press the dome-shaped center of movable contact 5 that corresponds to the pressed display part 10B. When a predetermined compressive force is applied, movable contact 5 is elastically inverted downward with a click feeling. As a result, movable contact 5 comes into contact at the center of its bottom surface with central fixed contact 8A, thereby electrically connecting central fixed contact 8A and outer fixed contact 8B.

When the user releases the compressive force applied to display sheet 10, movable contact 5 is elastically inverted upward by the elastic returning force. As a result, the center of the bottom surface of movable contact 5 is separated from central fixed contact 8A, thereby electrically disconnecting central fixed contact 8A and outer fixed contact 8B.

The electrical connection and disconnection of fixed contacts 8A and 8B switches the functions of the apparatus. When power is supplied from an electronic circuit of the apparatus, light-emitting devices 9 emit light, which is introduced into light guide sheet 3 from one side of base material 1 and propagates inward while being reflected in base material 1.

The light is diffused and reflected by light extracting elements 2 formed on the top surface of base material 1 so as to illuminate display parts 10B of display sheet 10 from below. Illuminating display parts 10B allows the user to easily distinguish between the characters, symbols, and the like on display parts 10B in dark environments.

In the conventional switch, as described above, when the user presses somewhere on display sheet 10 so as to press the top surface of light guide sheet 3, the corresponding movable contact 5 is elastically inverted, thereby electrically connecting or disconnecting fixed contacts 8A and 8B. The light of light-emitting devices 9 is introduced into light guide sheet 3 from one side of base material 1 so as to make light extracting elements 2 emit light, which illuminates display parts 10B of display sheet 10. A conventional technique related to the present invention is disclosed in Japanese Patent Unexamined Publication No. 2007-87749.

In the conventional switch including movable contact element 6 using light guide sheet 3, the light of light-emitting devices 9 is introduced into base material 1 from one side thereof to make light extracting elements 2 emit light concurrently, thereby illuminating display parts 10B by light of one color. Attempting to illuminate display parts 10B by light of different colors using light-emitting devices 9 having different luminous colors would require more than one light guide sheet. This would increase the number of components and assembly time.

SUMMARY OF THE INVENTION

An object of the present invention is to provide a light guide sheet and a movable contact element using the sheet, which have a simple structure and can be variously illuminated.

The light guide sheet according to the present invention includes a film-like base material; a plurality of irregular-shaped light extracting elements formed on the base material; and a plurality of light-transmissive, belt-shaped light guide parts each for connecting a predetermined number of groups of the light extracting elements. The movable contact element according to the present invention includes the light guide sheet according to the present invention; and dome-shaped movable contacts formed of a conductive sheet metal, the movable contacts being arranged on the bottom surfaces of the light extracting elements of the light guide sheet.

Thus, the present invention provides a light guide sheet and a movable contact element using the sheet, which have a simple structure and can be variously illuminated.

DETAILED DESCRIPTION OF THE INVENTION

Figure 1:
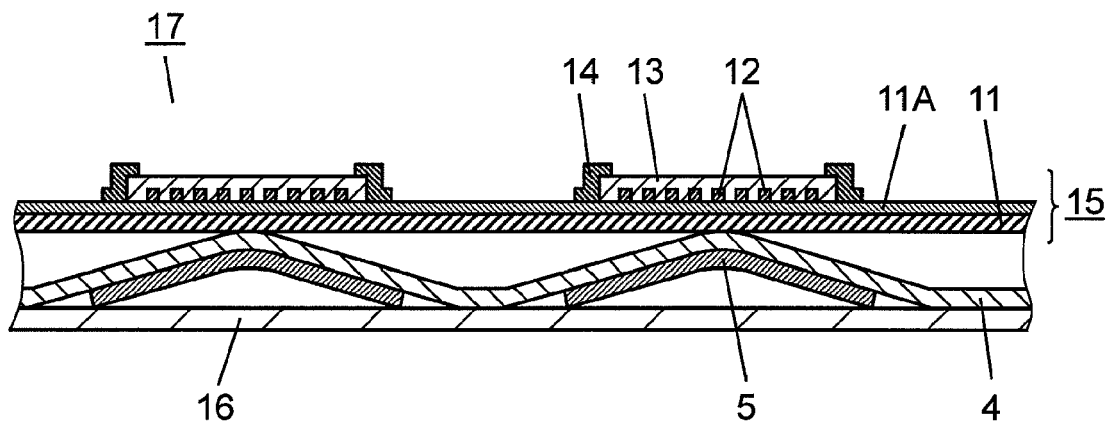
FIG. 1 is a sectional view of a movable contact element according to an embodiment of the present invention.

An embodiment of the present invention will be described as follows with reference to FIGS. 1 to 5. In these drawings, the dimensions of some parts are exaggerated for clarity. Like components are labeled with like reference numerals with respect to the switch described in the section of Background Art, and hence the detailed description thereof will be omitted.

Embodiment

Figure 2:
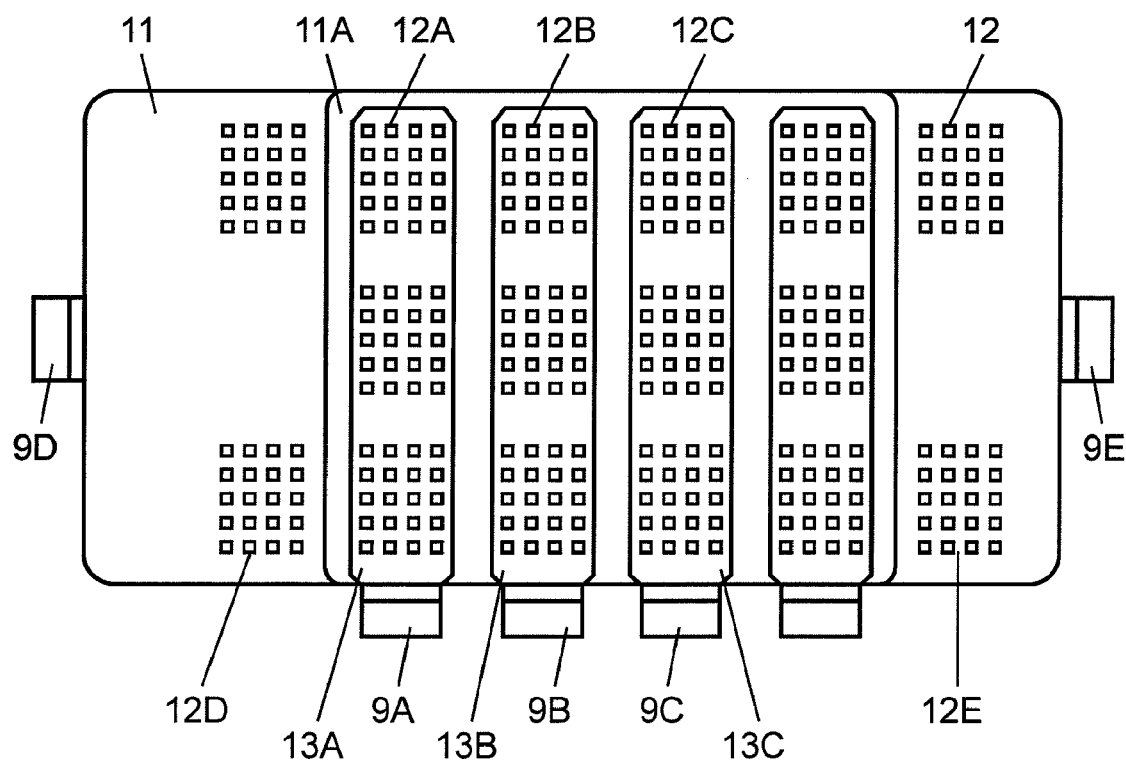
FIG. 2 is a plan view of the movable contact element according to the embodiment of the present invention.

FIGS. 1 and 2 are a sectional view and a plan view, respectively, of movable contact element 17 according to the embodiment of the present invention. In FIGS. 1 and 2, movable contact element 17 includes light guide sheet 15 including flexible, light-transmissive, film-like base material 11 and reflective layer 11A, which is formed in a predetermined position on the top surface of base material 11 by deposition or the like. Base material 11 is made of polyethylene terephthalate, polycarbonate, polyurethane, silicone, or the like, and reflective layer 11A is made of aluminum or the like.

Base material 11 is provided on its top surface with translucent irregular-shaped light extracting elements 12, and reflective layer 11A is provided on its top surface with light-transmissive, belt-shaped light guide parts 13. Light extracting elements 12 are made of polyester, epoxy, or the like and formed by printing or the like. Light guide parts 13 include light guide part 13A for connecting three groups of light extracting elements 12A, light guide part 13B for connecting three groups of light extracting elements 12B, and light guide part 13C for connecting three groups of light extracting elements 12C. Light guide parts 13 are made of polyester, epoxy, or the like and pasted on reflective layer 11A by printing or the like. Light guide sheet 15 also includes coating parts 14, which are painted white and formed on the side surfaces of light guide parts 13 by printing or the like.

Movable contact element 17 also includes film-like cover sheet 4 whose outer periphery is pasted at predetermined positions on the bottom surface of light guide sheet 15 via an adhesive (not shown). Movable contact element 17 also includes dome-shaped movable contacts 5, which are formed of a conductive sheet metal such as a copper alloy or steel, and pasted on the bottom surface of cover sheet 4 under light extracting elements 12. Movable contact element 17 also includes film-like separator 16 made of polyethylene terephthalate or the like, which is pasted over the entire bottom surface of cover sheet 4 so as to protect the bottom surfaces of movable contacts 5 from dust and dirt during storage or transportation.

Figure 3:
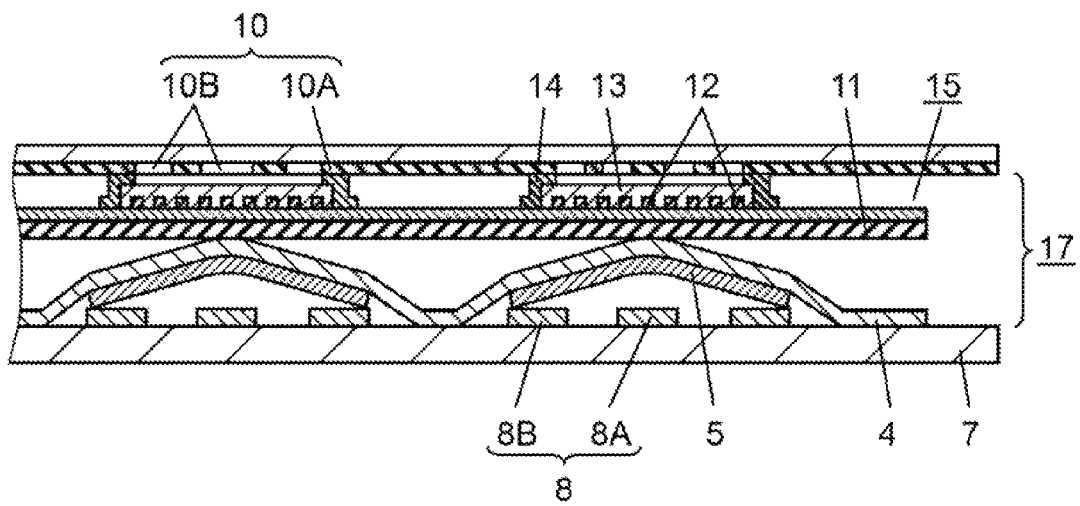
FIG. 3 is a sectional view of a switch using the movable contact element according to the embodiment of the present invention.

FIG. 3 is a sectional view of a switch using movable contact element 17 according to the embodiment. In FIG. 3, wiring board 7 is provided on its upper and lower surfaces with wiring patterns (not shown) made of copper or the like. Wiring board 7 can be a film made of polyethylene terephthalate, polycarbonate, or the like, or a plate made of paper phenol or glass-filled epoxy. Wiring board 7 is also provided on its top surface with fixed contacts 8 each consisting of circular central fixed contact 8A made of copper, carbon, or the like and horseshoe- or ring-shaped outer fixed contact 8B surrounding central fixed contact 8A.

Movable contact element 17 from which separator 16 has been removed is pasted on the top surface of wiring board 7. More specifically, the outer peripheries of movable contacts 5 are placed on outer fixed contacts 8B, and the centers of the bottom surfaces of movable contacts 5 are predeterminedly spaced from central fixed contacts 8A.

Wiring board 7 is also provided on its top surface with light-emitting devices 9A to 9E composed of light emitting diodes or the like, which are arranged on sides of light guide sheet 15. More specifically, as shown in FIG. 2, light-emitting devices 9A, 9B, and 9C are arranged with their light emitting surfaces facing one side of each of light guide parts 13A, 13B, and 13C, respectively. Light-emitting devices 9D and 9E are arranged with their light emitting surfaces facing one side of base material 11.

The switch includes light-transmissive, film-like display sheet 10, which is provided on its bottom surface with light shielding part 10A formed by printing or the like and display parts 10B hollowed out in the shape of characters, symbols, and the like. Display parts 10B are arranged over light extracting elements 12 of light guide sheet 15.

The switch thus structured is installed on the control surface of an electronic apparatus, with central fixed contacts 8A, outer fixed contacts 8B, and light-emitting devices 9 connected to electronic circuits (not shown) of the apparatus via the wiring patterns.

When the user presses one of display parts 10B of display sheet 10, light guide sheet 15 and cover sheet 4 are bent to press the substantially dome-shaped center of movable contact 5 that corresponds to the pressed display part 10B. When a predetermined compressive force is applied, movable contact 5 is elastically inverted downward with a click feeling. As a result, movable contact 5 comes into contact at the center of its bottom surface with central fixed contact 8A, thereby electrically connecting central fixed contact 8A and outer fixed contact 8B.

When the user releases the compressive force applied to display sheet 10, movable contact 5 is elastically inverted upward by the elastic returning force. As a result, the center of the bottom surface of movable contact 5 is separated from central fixed contact 8A, thereby electrically disconnecting central fixed contact 8A and outer fixed contact 8B.

The electrical connection and disconnection of fixed contacts 8A and 8B switches the functions of the apparatus. Light-emitting devices 9A to 9E are supplied with power from an electronic circuit of the apparatus. When, for example, light-emitting devices 9D and 9E are supplied with power and emit light, the light is introduced into light guide sheet 15 from one side of base material 11 and propagates inward while being reflected in base material 11.

The light is then diffused and reflected by light extracting elements 12D and 12E on the top surface of base material 11 so as to illuminate display parts 10B of display sheet 10 over light extracting elements 12D and 12E from below. Illuminating display parts 10B allows the user to easily distinguish between the characters, symbols, and the like on display parts 10B in dark environments.

When light-emitting device 9A emits light, the light is introduced into light-transmissive, belt-shaped light guide part 13A from one side thereof and propagates inward while being reflected in light guide part 13A. Then, the light is diffused and reflected by the three groups of light extracting elements 12A so as to illuminate display parts 10B over them from below. Similarly, when light-emitting device 9B emits light, the light is introduced into light guide part 13B from one side thereof to make the three groups of light extracting elements 12B emit light. When light-emitting device 9C emits light, the light is introduced into light guide part 13C from one side thereof to make the three groups of light extracting elements 12C emit light.

Assume that light-emitting devices 9D and 9E emit white light, and light-emitting devices 9A, 9B, and 9C emit blue, orange, and green light, respectively. Then, light extracting elements 12D and 12E emit white light, the three groups of light extracting elements 12A emit blue light, the three groups of light extracting elements 12B emits orange light, and the three groups of light extracting elements 12C emit green light. Thus, display parts 10B of display sheet 10 are illuminated with different colors from column to column.

Alternatively, it is possible that light-emitting devices 9A, 9B, 9C have the same luminous color as each other and are supplied with power from the electronic circuit of the apparatus with a certain time difference. This allows the three groups of light extracting elements 12A to emit light first, the three groups of light extracting elements 12B to emit light next, and the three groups of light extracting elements 12C to emit light last. As a result, display parts 10B are illuminated sequentially from column to column.

Reflective layer 11A of aluminum or the like disposed between light guide parts 13A, 13B, and 13C and base material 11 prevents the light of light-emitting devices 9A, 9B, and 9C from being leaked when propagating inward while being reflected in light guide parts 13A, 13B, and 13C, respectively. As a result, light extracting elements 12A, 12B, and 12C can emit bright light, and the light of light-emitting devices 9A, 9B, and 9C is prevented from being mixed with the light of light-emitting devices 9D and 9E.

Thus, in the switch according to the embodiment of the present invention, when the user presses somewhere on display sheet 10 so as to press the top surface of light guide sheet 15, the corresponding movable contact 5 is elastically inverted, thereby electrically connecting or disconnecting fixed contacts 8A and 8B. The light of light-emitting devices 9A to 9E is introduced into light guide sheet 15 from one side of base material 11 so as to make light extracting elements 12 emit light, which illuminates display parts 10B of display sheet 10.

As described above, light guide sheet 15 is provided with light extracting elements 12 and also with light-transmissive, belt-shaped light guide parts 13A, 13B, and 13C for connecting the predetermined number of groups of light extracting elements 12A, 12B, and 12C, respectively. This enables display parts 10B of display sheet 10 to be illuminated with different colors from column to column or sequentially with a time difference.

As described above, light extracting elements 12D and 12E formed on the top surface of base material 11, and the predetermined number of groups of light extracting elements 12A, 12B, and 12C connected by light guide parts 13A, 13B, and 13C, respectively, and can emit light of different colors from each other or emit light with a time difference. This allows display parts 10B to be variously illuminated by providing a simple single light guide sheet 15.

In the above description, reflective layer 11A is formed in a predetermined position on the top surface of base material 11; light extracting elements 12D and 12E are formed on top surface of base material 11; and the predetermined number of groups of light extracting elements 12A, 12B, and 12C connected by light guide parts 13A, 13B, and 13C, respectively, are formed on the top surface of reflective layer 11A. Alternatively, the present invention can be implemented using another light guide sheet.

Figure 4:
FIG. 4 is a sectional view of another light guide sheet according to the embodiment of the present invention.

FIG. 4 is a sectional view of another light guide sheet according to the embodiment of the present invention. In FIG. 4, film-shaped base material 11 is provided on its top surface with reflective layer 11A. Reflective layer 11A is provided on its top surface with irregular-shaped light extracting elements 12A and 12B formed by printing or the like, and light-transmissive belt-shaped light guide parts 13A and 13B for connecting a predetermined number of groups of light extracting elements 12A and 12B, respectively.

In the light guide sheet of FIG. 4, light guide parts 13A and 13B may be formed using a belt-shaped film-like sheet instead of being printed. In this case, irregular-shaped light extracting elements 12A and 12B are formed on the bottom surface of the sheet. Then, the sheet is pasted on the top surface of reflective layer 11A of base material 11 with an adhesive.

Figure 5:
FIG. 5 is a sectional view of another light guide sheet according to the embodiment of the present invention.
Figure 6:
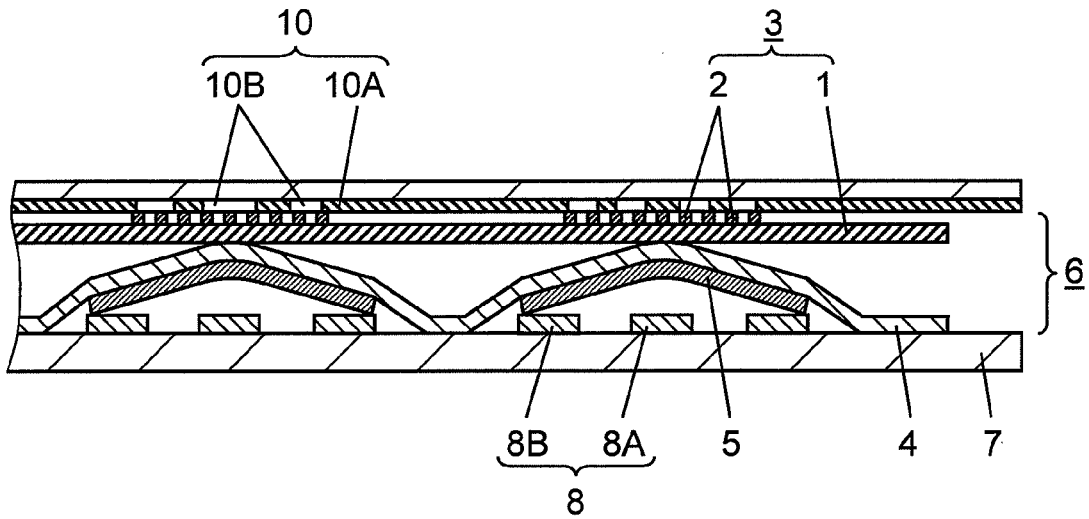
FIG. 6 is a sectional view of a conventional switch.
Figure 7:
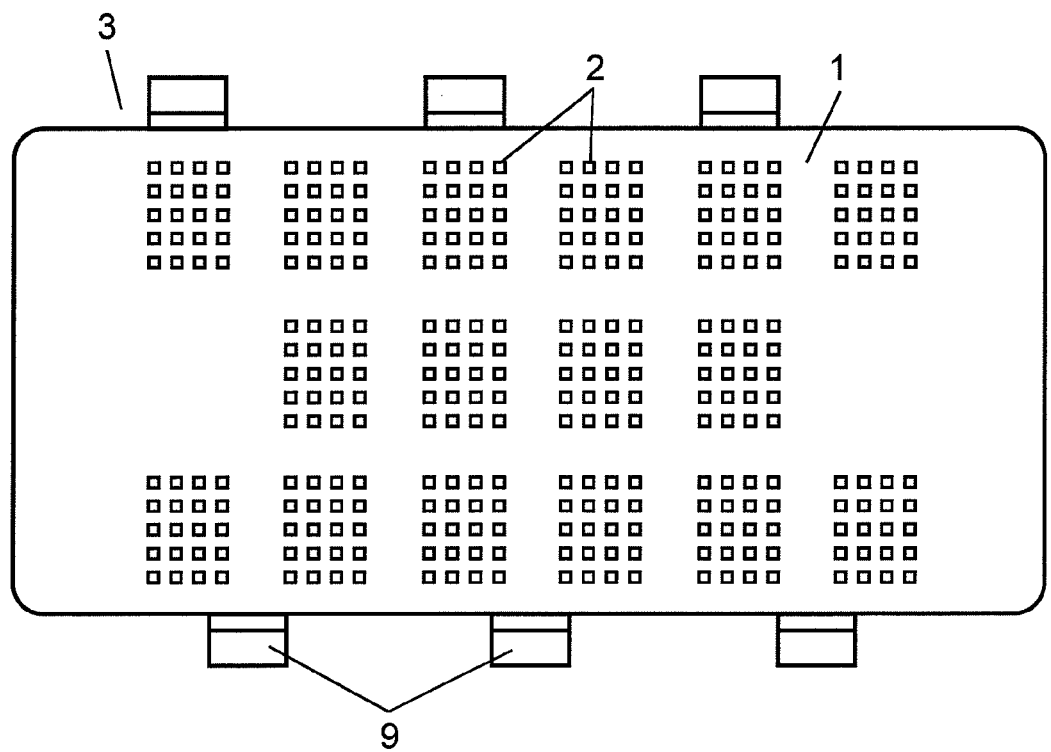
FIG. 7 is a plan view of the conventional switch.

FIG. 5 is a sectional view of another light guide sheet according to the embodiment of the present invention. In the light guide sheet of FIG. 5, irregular-shaped light extracting elements 12A and 12B, and light guide parts 13A and 13B for connecting a predetermined number of groups of light extracting elements 12A and 12B, respectively, are formed in the top surface of base material 11' by two-color molding or the like. Base material 11' is white or translucent and film-like. Light guide parts 13A and 13B are light-transmissive, belt-shaped, and made of polycarbonate, acrylic, or the like.

When light guide parts 13A and 13B are formed in base material 11' by two-color molding or the like, base material 11' can be designed to have a lower refractive index than light guide parts 13A and 13B so as to prevent light leakage in light guide parts 13A and 13B, thereby making light extracting elements 12A and 12B emit bright light. For example, light guide parts 13A and 13B may have a refractive index of 1.55 to 1.6, and base material 11' may have a refractive index of 1.45 to 1.55.

A switch can be formed by arranging movable contacts 5 and fixed contacts 8 under light extracting elements 12A and 12B of the light guide sheet and by arranging light-emitting devices 9A and 9B with their light emitting surfaces facing one side of light guide parts 13A and 13B. Furthermore, light-emitting devices 9A and 9B may have different luminous colors from each other or emit light with a time difference so as to variously illuminate display parts 10B.

In the above description, light guide parts 13A, 13B, and 13C are designed to emit light using light-emitting devices 9A, 9B, and 9C having different luminous colors from each other. Illumination, however, can be achieved in other different ways. For example, light guide parts 13A and 13B may be connected at their ends so as to emit light of the same color using a single light-emitting device, while light guide part 13C is made to emit light of a different color.

Thus, in the embodiment, film-like base material 11 (and 11') is provided with irregular-shaped light extracting elements 12 and light-transmissive, belt-shaped light guide parts 13 each for connecting a predetermined number of groups of light extracting elements 12. Dome-shaped movable contacts 5 formed of a conductive sheet metal are arranged on the bottom surfaces of light extracting elements 12. This structure allows light extracting elements 12 to emit light of different colors from each other or to emit light with a time difference by making light guide parts 13 introduce the light of the light-emitting devices corresponding thereto. As a result, movable contact element 17 can be achieved using simple single light guide sheet 15 capable of being variously illuminated.

In the above description, irregular-shaped light extracting elements 12 and light-transmissive, belt-shaped light guide parts 13 are formed on the top surface of base material 11 (and 11') of light guide sheet 15 over movable contacts 5. Alternatively, light extracting elements 12 and light guide parts 13 may be formed on the bottom surface of base material 11 (11') so as to diffuse and reflect light for illumination in the same manner.

In the above description, cover sheet 4 having movable contacts 5 pasted on its bottom surface is pasted on light guide sheet 15. Alternatively, it is possible not to use cover sheet 4 and to paste movable contacts 5 directly on the bottom surface of light guide sheet 15. This structure can reduce the number of components, making the movable contact element simpler and less expensive.

The light guide sheet and the movable contact element using the sheet according to the present invention are useful for the operation of various electronic apparatuses because of having a simple structure and capable of being variously illuminated.

What is claimed is:

1. A light guide sheet for guiding light from separate light sources to illuminate respective display parts of a display sheet, said light guide sheet comprising:
    a common base film having upper and lower surfaces facing away from each other and respectively constituting upper and lower boundary surfaces of said common base film;
    a common reflective layer formed on said upper surface of said common base film;
    a first grouped plurality of light extracting elements formed on a first area of an upper surface of said common reflective layer, said first grouped plurality of light extracting elements being disposed for illuminating a first of the respective display parts of the display sheet;
    a first belt-shaped light guide part formed on said common reflective layer, said first belt-shaped light guide part being a printed light guide part printed in said first area of said upper surface of said common reflective layer in a location to connect said first grouped plurality of light extracting elements to a first of the light sources;
    a second grouped plurality of light extracting elements formed on a second area of said upper surface of said common reflective layer, said second grouped plurality of light extracting elements being disposed for illuminating a second of the respective display parts of the display sheet; and
    a second belt-shaped light guide part formed on said common reflective layer, said second belt-shaped light guide part being a printed light guide part printed in said second area of said upper surface of said common reflective layer in a location to connect said second grouped plurality of light extracting elements to a second of the light sources;
    wherein said second area of said upper surface of said common reflective layer is separate from said first area of said upper surface of said common reflective layer, and said second grouped plurality of light extracting elements is grouped separately from said first grouped plurality of light extracting elements; and
    wherein said second belt-shaped light guide part is separate from said first belt-shaped light guide part for respectively separately guiding light from the separate light sources to said first and second grouped pluralities of light extracting elements to respectively illuminate the display parts of the display sheet.

2. A movable contact element comprising:
    the light guide sheet of claim 1; and
    dome-shaped movable contacts formed of a conductive sheet metal, the movable contacts being arranged on bottom surfaces of the light extracting elements of the light guide sheet.

3. The light guide sheet of claim 1, wherein
    said common base film is constituted by a light-transmissive material for guiding light;
    said common reflective layer does not cover an entirety of said base film, such that said common reflective layer leaves areas of said base film exposed from said common reflective layer; and
    at least one additional light extracting element is provided at one of the areas of said base film that are exposed from said common reflective layer.

4. The light guide sheet of claim 1, further comprising:
    coating parts formed on side faces of each of said first and second light guide parts.

5. A movable contact element comprising:
    the light guide sheet of claim 4; and
    dome-shaped movable contacts formed of a conductive sheet metal, the movable contacts being arranged under the light extracting elements of the light guide sheet.

6. The light guide sheet of claim 1, wherein
    said first and second belt-shaped light guide parts are constituted by first and second elongated light guide parts spaced apart from each other.

7. A movable contact element comprising:
    the light guide sheet of claim 6; and
    dome-shaped movable contacts formed of a conductive sheet metal, the movable contacts being arranged under the light extracting elements of the light guide sheet.

8. The light guide sheet of claim 6, wherein
    said first and second elongated light guide parts are spaced apart from each other in a lateral direction thereof.

9. A movable contact element comprising:
    the light guide sheet of claim 8; and
    dome-shaped movable contacts formed of a conductive sheet metal, the movable contacts being arranged under the light extracting elements of the light guide sheet.

10. The light guide sheet of claim 8, wherein
    said first and second light guide parts are each elongated in a longitudinal direction thereof; and
    coating parts are formed on lateral side faces of each of said first and second light guide parts such that said coating parts are spaced apart from each other in the lateral direction.

11. A movable contact element comprising:
    the light guide sheet of claim 10; and
    dome-shaped movable contacts formed of a conductive sheet metal, the movable contacts being arranged under the light extracting elements of the light guide sheet.

* * * * *